US009533630B2

(12) United States Patent
Foss et al.

(10) Patent No.: US 9,533,630 B2
(45) Date of Patent: Jan. 3, 2017

(54) HIGH PERFORMANCE MOLDABLE COMPOSITE

(71) Applicant: Nonwoven Networks LLC, Naples, FL (US)

(72) Inventors: Stephen W. Foss, Naples, FL (US); Jean-Marie Turra, Greer, SC (US)

(73) Assignee: Nonwoven Network LLC, Naples, FL (US)

(*) Notice: Subject to any disclaimer, the term of this patent is extended or adjusted under 35 U.S.C. 154(b) by 0 days.

(21) Appl. No.: 14/874,947

(22) Filed: Oct. 5, 2015

(65) Prior Publication Data
US 2016/0121814 A1    May 5, 2016

Related U.S. Application Data

(60) Provisional application No. 62/185,575, filed on Jun. 27, 2015, provisional application No. 62/072,305, filed on Oct. 29, 2014.

(51) Int. Cl.
G10K 11/172    (2006.01)
E04B 1/86      (2006.01)
(Continued)

(52) U.S. Cl.
CPC ....... *B60R 13/0815* (2013.01); *B29C 47/0057* (2013.01); *B29C 66/4722* (2013.01); *B32B 5/022* (2013.01); *B32B 5/20* (2013.01); *B32B 5/245* (2013.01); *B32B 37/203* (2013.01); *D04H 1/435* (2013.01); *D04H 1/541* (2013.01); *D04H 1/558* (2013.01); *B29C 47/0021* (2013.01); *B29C 47/0064* (2013.01); *B29K 2067/003* (2013.01);
(Continued)

(58) Field of Classification Search
CPC .............................. G10K 11/172; E04B 1/86
USPC ......................................................... 181/290
See application file for complete search history.

(56) References Cited

U.S. PATENT DOCUMENTS 3,607,602 A    9/1971    Greskiewicz
3,919,444 A    11/1975   Shayman
(Continued)

FOREIGN PATENT DOCUMENTS

DE    19808425 A1    9/1999
EP    1013414 A2     6/2000
(Continued)

OTHER PUBLICATIONS

Extended European Search Report for EP Application No. 15162188.5 dated Mar. 15, 2016.
(Continued)

*Primary Examiner* — Forrest M Phillips
(74) *Attorney, Agent, or Firm* — Lerner, David, Littenberg, Krumholz & Mentlik, LLP

(57) ABSTRACT

A moldable composite with high heat resistance and noise absorption properties utilizes nonwoven fabrics and a heat resistance additive. The composition that provides both superior acoustic performance and excellent flex modulus that may be utilized in automotive products and applications in interior and exterior structures. A blowing agent may be utilized to create micro porous cells in a polymer non-woven structure. The cells or voids make the material lighter and allow the material to have superior acoustic properties that are useful in automotive applications.

27 Claims, 6 Drawing Sheets

(51) Int. Cl.

| | | |
|---|---|---|
| *B60R 13/08* | (2006.01) | |
| *B32B 5/24* | (2006.01) | |
| *B32B 5/02* | (2006.01) | |
| *B32B 5/20* | (2006.01) | |
| *B29C 65/00* | (2006.01) | |
| *B32B 37/20* | (2006.01) | |
| *D04H 1/435* | (2012.01) | |
| *D04H 1/541* | (2012.01) | |
| *D04H 1/558* | (2012.01) | |
| *B29C 47/00* | (2006.01) | |
| *B29K 67/00* | (2006.01) | |
| *B29K 105/04* | (2006.01) | |
| *B29K 105/00* | (2006.01) | |
| *B29L 31/30* | (2006.01) | |

(52) U.S. Cl.
CPC ...... *B29K 2105/04* (2013.01); *B29K 2105/041* (2013.01); *B29K 2105/045* (2013.01); *B29K 2105/25* (2013.01); *B29K 2995/0001* (2013.01); *B29K 2995/0016* (2013.01); *B29L 2031/3005* (2013.01); *B32B 2262/0253* (2013.01); *B32B 2262/0284* (2013.01); *B32B 2262/14* (2013.01); *B32B 2266/025* (2013.01); *B32B 2307/102* (2013.01); *B32B 2605/08* (2013.01)

(56) References Cited

U.S. PATENT DOCUMENTS

| | | | |
|---|---|---|---|
| 5,000,992 | A | 3/1991 | Kelch |
| 5,545,441 | A | 8/1996 | Land |
| 5,558,710 | A | 9/1996 | Baig |
| 5,567,511 | A | 10/1996 | Shih et al. |
| 6,855,753 | B1 | 2/2005 | Englert |
| 6,877,585 | B2 | 4/2005 | Tinianov |
| 8,173,233 | B2 | 5/2012 | Rogers et al. |
| 8,337,976 | B2 | 12/2012 | Mayers et al. |
| 8,496,088 | B2* | 7/2013 | Kitchen .................... B32B 5/26 181/290 |
| 9,234,348 | B1 | 1/2016 | Lehane et al. |
| 2004/0231915 | A1* | 11/2004 | Thompson, Jr. .......... B32B 5/02 181/290 |
| 2005/0003728 | A1 | 1/2005 | Foss |
| 2005/0136100 | A1* | 6/2005 | Foss ....................... A01N 57/16 424/443 |
| 2006/0065482 | A1* | 3/2006 | Schmidft .............. B60R 13/083 181/290 |
| 2006/0137799 | A1 | 6/2006 | Haque et al. |
| 2006/0141884 | A1 | 6/2006 | Haque |
| 2006/0289231 | A1* | 12/2006 | Priebe .................... B32B 3/266 181/290 |
| 2009/0242325 | A1* | 10/2009 | Dellinger .................. E04B 1/84 181/290 |
| 2011/0114414 | A1* | 5/2011 | Bliton ....................... B32B 5/26 181/286 |
| 2013/0288556 | A1* | 10/2013 | Moore .................... D04H 1/435 442/334 |
| 2014/0079938 | A1 | 3/2014 | Perick et al. |

FOREIGN PATENT DOCUMENTS

| | | |
|---|---|---|
| EP | 2781636 A1 | 9/2014 |
| EP | 2860294 A1 | 4/2015 |
| WO | 0151546 A1 | 7/2001 |
| WO | 0209089 | 1/2002 |
| WO | 2007061423 A2 | 5/2007 |
| WO | 2009088648 A1 | 7/2009 |

OTHER PUBLICATIONS

Partial European Search Report for EP Application No. 15162186.9 dated Mar. 8, 2016.

Nonwoven Network, "Spotlight", retrieved from <http://www.nonwovennetwork.com/docs/spotlight.htm>, printed on Feb. 25, 2015.

Tascan, "Effects of Fiber Denier, Fiber Cross-Sectional Shape and Fabric Density on Acoustical Behavior of Vertically Lapped Nonwoven Fabrics", Journal of Engineered Fibers and Fabrics, vol. 3, Issue 2, 2008, pp. 32-38.

Shahani, F., Soltani, P., et al., The Analysis of Acoustic Characteristics and Sound Absorption Coefficient of Needle Punched Nonwoven Fabrics, Journal of Engineered Fibers and Fabrics, vol. 9, Issue 2—2014.

Extended European Search Report for Application No. EP15162186 dated Jul. 21, 2016.

Extended European Search Report for Application No. 15192094.9 dated Jul. 19, 2016.

\* cited by examiner

HIGH PERFORMANCE MOLDABLE COMPOSITE

CROSS-REFERENCE TO RELATED APPLICATION

The present application claims the benefit of the filing date of U.S. Provisional Patent Application No. 62/072,305 filed Oct. 29, 2014 and U.S. Provisional Patent Application No. 62/185,575 filed Jun. 27, 2015, the disclosures of which are hereby incorporated herein by reference.

BACKGROUND OF THE INVENTION

The need for higher performance materials in the automotive industry has increased more than ever in past decades Improved technology has produced cars that not only drive faster and more economical but also have more electronic options such as in multimedia devices. Once where an auxiliary-in port was rare in an automobile, today they are fully connected with USB and Bluetooth ports and the like that integrate media players and cell phones directly into factory sound systems. With this increase demand on automobile sound systems, a requirement for better acoustics in the automobile has been seen in recent years.

Acoustic impedance is an important physical property in substances that determine the substances ability to absorb sound. Specific Acoustic Impedance is the ratio between the sound pressure and the particle velocity produced by a sound wave moving through the substance. When sound waves pass through any physical substance, pressure of the sound waves causes the particles of the substance to move. Specific Acoustic Impedance is also directly related to the resistance of airflow. Specific Acoustic Impedance is measured in RAYLS. The higher number of RAYLS, the lower the velocity of sound transmission through a medium. A fabric is considered to have better acoustic sound absorption with a higher RAYLS number.

Having external noises removed from the automobile cabin is an issue that automobiles of the past did not need to contend with, however, with advancements in digital media and sound systems for cell phones, music and the like, the importance of filtering out external sounds from the driver's cabin is more important than ever before.

In the past, wind noise was a significant cause of noise in automobiles. When automobiles were not aerodynamically shaped as they are now, various objects like chrome molding surrounding the windshield glass created turbulence resulting in wind noise. Wind turbulence around door mounted minors was also a notorious noise maker. However, today's streamlined designs have significantly reduced such turbulence along with its accompanying noise. However, even with the aerodynamic design, today's cars still have air rushing past the vehicle creating noise heard through the doors.

Today noise created by the road traveled is one of the largest contributors to noisy automobile interiors. Road noise typically originates from tires running over road surfaces and may take on two forms of noise called acoustic noise and conductive noise.

Acoustic noise is transmitted from the surface of the road through the air and into the driver's cabin. This noise may be treated by adding acoustical material to surround the driver's cabin and doors. However such materials lack the structural properties and strength as well as the light weight needed for automotive applications.

Conductive road noise is caused by vibrations conducted from the road surface through the automobile's tires and suspension into the driver's cabin. Even with advancements in tire technology to achieve quieter tires noise is still produced by the road and enters into the driver's cabin. With today's common use of run flat tires or low profile tires, these noises are compounded due to the significant amount of less rubber on the tires of today's automobiles. Thus there still remains a need for a material that is structural sound for automotive applications lightweight and produced the acoustic effect necessary to eliminate noise in the driver's cabin for today's electronics and sound systems.

In addition, due to the higher performance automobiles, generation of heat from the engine has become an ever increasing problem. Within the Automotive Industry over the past 50 years, there have been increased requirements for improved flame resistance. After many car fires, the industry adopted standard MVSS 302 from the National Highway Traffic Safety administration. Even with the evolution of all-electric vehicles, there is a need for improved fire resistant and low-smoke fabrics. This test is a horizontal burn test that tests among other things the flammability of the interior of the automobile and engine compart. The test involves taking a sample 14"×4" and placing the sample on a metal frame. A flame via a Bunsen burner or other device is applied under the front edge of the 4" width. The flame is placed under the fabric and the fabric is allowed to burn for 15 seconds.

Originally this flame test required that fabric burn less than 101.6 mm/minute (4 inches/minute). The presence of any noxious gases is also observed during the test. Over the years, many automobile manufacturers have made the flame test results more restrictive. Some automotive manufacturers have reduced the burn rate to 2 inches per minute and down to 1 inch per minute. The requirements for some applications, for example such as engine compartment areas, have required that the sample be SE (self-extinguishing) with a zero burn rate and in some cases with the strictest requirement which is DNI (did not ignite).

Recently, several Automotive Manufacturers have focused on another flame test developed by Underwriters Laboratories, a flame test UL-94, which is a vertical flame test. This flame test requires a 5"×½" fabric sample held vertically. A flame is placed under the fabric sample for two-10 second intervals.

The results of the flame test UL-94 are report as:
HB: slow burning on a horizontal specimen; burning rate <76 mm/min for thickness <3 mm or burning stops before 100 mm
V-2: burning stops within 30 seconds on a vertical specimen; drips of flaming particles are allowed.
V-1: burning stops within 30 seconds on a vertical specimen; drips of particles allowed as long as they are not inflamed.
V-0: burning stops within 10 seconds on a vertical specimen; drips of particles allowed as long as they are not inflamed.
5VB: burning stops within 60 seconds on a vertical specimen; no drips allowed; plaque specimens may develop a hole.
5VA: burning stops within 60 seconds on a vertical specimen; no drips allowed; plaque specimens may not develop a hole.

The automotive industry, among other industries, have found it very difficult if not impossible to find fibrous nonwoven fabrics that can meet both the above acoustic and flame resistance requirements. Fabrics are needed in the automotive industry for good acoustical qualities and these fabrics must be located near the engine or exhaust system so flame resistance properties are essential. There is also a need for fabrics with low-smoke properties. Further, there is a need for fabrics that are moldable with standard thermoplastic molding equipment, yet still have excellent thermal stability after molding. There still remains in the art a need for a moldable nonwoven fabric with enhanced flame resistance and excellent thermal stability.

Single layer nonwovens have tried to increase RAYLS by using more fine fibers to create a denser medium to reduce air flow, and hence reduce sound transmission. However this technique has not been achieved at a practical cost or weight.

At the same time, the Automobile Manufacturers have found a need for an Underbody Shield to be moldable, durable and fit under the vehicle to prevent road and wind noise from penetrating upward into the passenger compartment. Further, it has been shown that these composites are weighing close to 2,000 gsm (grams per square meter) to achieve the noise reduction levels desired. This amount of weight is too much for an automobile part due to stability of the vehicle, drag and energy efficiency concerns.

In addition, due to the high heat exposure from engine parts, a need exists for a product that does not exhibit failure during heat aging up to 150° C.; has resistance to water, oil, and engine fluids, has low flame spread and low smoke, and is recyclable back into itself. Further, these moldable products must have excellent abrasion resistance against sand & gravel.

Further environmental factors for automotive products include the exposure to moisture. Any materials coated with heat resistant coatings or coatings that increase acoustic impedance are easily worn away by the harsh environmental conditions of the undercarriage and wheel wells of the automobile. Rain, snow, ice and salt as well as other particles are common environmental conditions that affect an automobile's undercarriage and wheel wells as well as other portions of the automobile. Any coatings or non-structural material used that contain heat resistant or acoustical properties are easily worn away in such environments.

Thus there still exists a need for an acoustic absorber that is thermo-formable or otherwise moldable, light weight, resistant to water penetration and other environmental factors, flame resistance, and has a high RAYLS number.

SUMMARY OF THE INVENTION

The invention utilizes a flame resistance additive into a polymer such as a polyester, including but not limited to PET, PETG and the like. Such flame resistance additives may include for example, polyphosphonates, such as found in the Americhem 33558-F1 (CAS #68664-06-2). This flame resistance family of compounds was found very successful for low smoke and flame spread. Certain polyphosphonates are used in PET for children's sleepwear and are considered safe for personnel use and the environment. Other flame resistant additives such as organophosphates, phosphonates, antimony trioxide, and the like may also be used. There is a wide class of organohalogen compounds that are effective but they may carry safety and health concerns.

By incorporating a flame resistance additive into a molten polymer of the high melt fiber, a highly flame resistant moldable composite can be formed that will meet newer, more stringent flame resistance. The process is preferable performed where the fiber is extruded below 300° C. and more preferably below 290° C.

The method of manufacturing the nonwoven automotive material of the present invention requires a carrier fiber that is compounded to contain a flame retardant. The flame retardant is not a coating and is instead chemically bonded to the fiber during the compounding process. The carrier fiber, preferably polyethylene glycol (PETG) cyclohexanedimethanol (CHDM) or the like is compounded with a flame retardant. The PETG is a stiff material giving strong physical properties needed for automotive structural use unlike other polymers like polyurethane and other Styrofoam (expanded polystyrene) like materials. The flame retardant used with the carrier fiber is heat sensitive so compounding the flame retardant into the carrier fiber is done at a very low heat level and with low heat history. For a polyphosphate based flame retardant, concentrated polyphosphate degrades around 285° C. Preferably the carrier fiber is compound extruded at 280° C. or lower with no heat history. The extrusion process is given a low draw ratio of approximately 2-2.5 to prevent crystallinity from occurring. By creating an amorphous carrier fiber, the carrier fiber will melt at a lower temperature creating a melted filling within the pores of the nonwoven material further blocking air and creating resistance for sound.

Another advantage of using high melt PET is that the polymer can come from recycled bottles and the waste from the molded products can be recycled back into new fibers.

The invention utilizes a manufacturable or moldable composite consisting of a blend of composite fibers. The invention may also utilize at least two layers of moldable nonwoven fabrics. An extruded layer of blown film is used to make the material lighter and provide the necessary acoustic qualities of the material. In addition, a single layer nonwoven can be produced using the high melt fiber with FR additive and a binder of PETG or the High melt fiber with a binder of PETG containing the FR additive.

The composite material is made from a film such as, but not limited to low density polyethylene, linear low density polyethylene, high density polyethylene, polypropylene, polyvinyl chloride, polyethylene terephalate, polyethylene terephalate glycol-modified, polyamide, nylon and the like. A polyethylene glycol-modified (PETG) may be used as a binder fiber. Polylactic acid (PLA) may also be used in the composite material. Other binder fibers may be used including Isophthallic modified PET, polyethylene, and polypropylene. A blowing agent such as an inert gas of air, nitrogen, carbon dioxide, helium, argon, oxygen or the like may be used to generate cells within the film. The cells created provide lighter weight and increased acoustic capability for the composite material.

During blending fiber finishes such as Goulston L624 (fluorocarbon) may be applied during blending. Other finishes such as Lurol 14951 may be blended with L624 to achieve heat and/or fire retardant characteristics. Anti-stats such as ASY may be added to improve run ability especially with low humidity conditions.

The nonwoven material may include polyethylene terephthalate glycol-modified (PETG) as a binder. When the PETG is melted it flows uniformly and formed meniscus at the bond points of the high melt fibers. The level of the PETG percentage controls the stiffness and the air flow resistance.

Further the nonwoven may use in addition to or as a replacement binder Polylactic Acid (PLA) such as fibers made from Cargill's PLA Ingeo polymer with a melting point of 140° C. The PLA may or may not be blended with the above PETG fibers.

DETAILED DESCRIPTION

Figure 1:
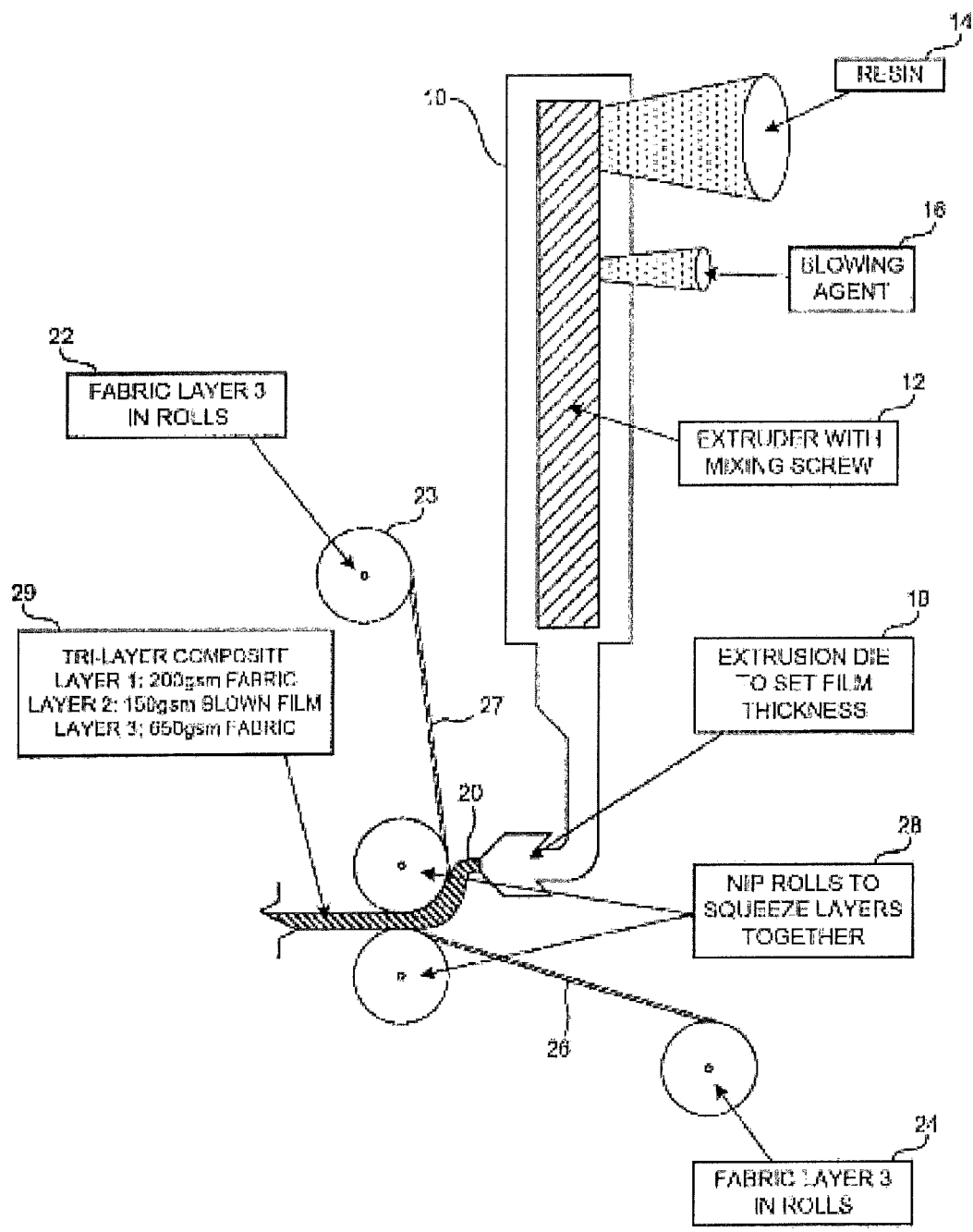
FIG. 1 is a flow diagram showing one embodiment of manufacturing a composition in accordance with the present disclosure.

In experimental trials, black 6d PET was produced with the formula which resulted in 2,500 ppm of Polyphosphinate in the fiber: Clean, PET Bottle flake 92.8%; Americhem 33558-F1 5.0% Black Pigment 50% in PE 2.2%.

These fibers were blended with Black PETG 4 denier fibers to produce a needle-punched nonwoven at a weight of 1,000 grams/ Meter$^2$. After molding, the product passed the UL 94 test with a V-0 rating. Fibers can be made from 0.9 denier to 50 denier in lengths from 25 mm to 180 mm.

However, incorporating the polyphosphinate into the low melt fiber such as PETG, Isophthalic modified PET, or polyethylene would allow extrusion at lower melt temperatures and ensure there is very little degradation of the polyphosphinate which is susceptible to significant degradation above 290° C.

A low melt fiber that incorporates a flame retardant such as polyphosphinate, organophosphates, phosphonates, antimony trioxide, or even halogens, would be able to be blended with untreated fibers such as cotton, wool, flax, jute, or hemp. The low melt fiber could be blended with all higher melt fibers that have a melt temperature at least 10° C. (19° F.) higher than the low melt fiber.

By blending either high melt fibers with an internal flame retardant with untreated low melt fibers or by blending untreated high melt fibers with an internal flame retardant low melt fiber, a moldable composite suitable for automotive applications requiring heat stability and excellent flame resistance can be produced.

Further, blending a high melt fiber with internal flame retardant with a low melt fiber with an internal flame retardant produces composites with superior flame resistance.

Blending a low melt fiber with internal flame resistance with a natural fiber such as: cotton, wool, flax, jute, or hemp allows the use of non-inherent flame resistant fibers to be used in moldable composites. Some of these fibers are naturally resistant to high heat applications, but cannot be used because they burn easily. This eliminates the need to apply topical flame retardants which could cause harmful chemicals to touch the personnel using these moldable composites.

Further, nonwoven fabrics can be made by many processes including but not limited to: Needle Punch, Spun-Lace, Thermal Bonded, AirLaid and Through Air Bonding.

Moldable composites can be made in weights from 50 to 2,500 grams per square centimeter. Fibers can be made from 0.7 denier to 100 denier and in lengths from 0.5 to 7 inches for these applications.

The high melt fibers can range from 30 to 95% of the blend while the low melt fibers can range from 5 to 70% of the blend. The flame retardant additives can range from 0.1 to 7% of the total fiber by weight. Bi-Component polyester fibers with a low melt sheath are widely used within the automotive industry for moldable composites. But, generally, these do not meet the stringent requirements for the UL-94 flame test. By incorporating the flame retardant additives shown above in either the core or the sheath of the fiber, these bi-component fibers could be used in automotive moldable composites to meet the UL-94 test.

Blowing agents in film may be utilized to make a bi-layer (two layers) or tri-layer (tri-lament)with three layers composite with controlled micro-porosity. In addition various combination may be used such as 2 film layers with a single composite layer or 2 film layers with 2 composite layers. Various combinations of the total layers may be used such as placing the film layer between the two composite layers, or having two film layers outside and attached to a single composite layer. Layers may be alternated such as film, composite layer, film, composite layer or composite layer film, composite layer, film as well as various other combinations depending on the embodiment. While flame-retardants can easily be incorporated into the extruded film, it is preferable to incorporate the flame retardants into the fibers on either side of the film as the fabric is the first material to be exposed to the flame.

Moldable nonwoven fabrics depend on the blending of fibers with high melt temperatures and fiber of low melt temperatures. The high melt temperature fibers used are Polyester (PET), PBT, Polyamide (Nylon 6 or Nylon 6,6), Acrylic, polypropylene, Polylactic Acid (PLA) and fiberglass. In addition, natural fibers that do not melt can be used, such as: cotton, wool, flax, jute, or hemp, and the like.

Low melt fibers such as: Polyethylene, Isophthalic modified Polyester, PETG, and co-PLA can be used as the binder fibers to provide stiffness and durability.

Generally there is at least at 10° C. (19° F.) difference in melt temperatures (and usually greater) to allow the low melt fiber to melt and stick to the high melt fibers. PETG fibers that are amorphous typically may have a melt temperature of 160-165° C. Eastman Chemical, SK Chemicals, and Artenius Italia are manufacturers of PETG. Cyclohexane dimethanol (CHDM) can be added to the polymer backbone in place of ethylene glycol. Since this building block is much larger (6 additional carbon atoms) than the ethylene glycol unit it replaces, it does not fit in with the neighboring chains the way an ethylene glycol unit would. This molecular structure interferes with crystallization and lowers the polymer's melting temperature. In general, such PET is known as PETG or PET-G (Polyethylene terephthalate glycol-modified). The most common Eastman PETG types used during the experiments were: 6763; 14471; and GN-071.

Nonwoven Network, LLC pioneered a Tri-layer product known as Raptor™ that contains a 500 gsm (grams per square meter) polyester absorber layer, and 150 gsm PP film layer acting as a barrier layer, and a 375 gsm polyester absorber layer. This product provides superior sound attenuation qualities and also has an impervious layer that prevents water from penetrating to the metal frame of the vehicle.

Further, Nonwoven Network LLC has developed a new concept in acoustic noise reduction from the wheel wells, especially in Sport Utility Vehicles. Raptor™ is a tri-laminate composite that incorporates an absorber layer-barrier layer-absorber layer to dramatically reduce the noise in the cabin with vehicles with large tires and aggressive treads. The product is in full production in a recently launched vehicle and has received outstanding reviews for sound and durability.

The Tri-Layer Raptor™ product has the best acoustics for a 1,015 gsm product, however there is a need to improve its performance while keeping the weight at the same level.

The invention utilizes a low melt fiber made from a co-polyester where cyclohexane dimethanol (CHDM) has been substituted for some of the ethylene glycol (EG) normally polymerized with Purified Terephthalic Acid to produce Polyester (PET). The result is a polymer called PETG. The melting point of the polymer can be adjusted from 110° C. to 170° C. by adjusting the ratio of CHDM to EG.

The PETG will be blended with Standard PET fiber that has been heat set to 190° C.

Fibers made from Polylactic Acid (PLA) such as fibers made from Cargill's PLA Ingeo polymer the have been drawn and fully crystallized with a melting point of 140° C. and above are blended with Polyester (PET) fibers that have been heat set at 170° C. or above.

The plastics industry has used Blowing Agents to expand the plastic films and injection molded parts by injecting inert gasses such as $N_2$ (Nitrogen) or $CO_2$ (Carbon Dioxide). The first known use was in 1846 when Hancock received a patent to make synthetic sponges with rubber. Other blowing agents such as Sodium Bi-Carbonate (Commonly known as Baking Powder) have been used in bakery products (cakes) and plastics. Ethylene Carbonate decomposes with heat to produce $CO_2$ Ammonium Nitrate decomposes with heat to produce $N_2$.

Examples of companies that make Blowing agents for plastic extrusion include Techmer, Clariant, Reedy, Kibbechem, Wells, and Beryl for example.

It is also possible to inject inert gasses directly into the extruder as shown by Linde Industrial gasses such as Nitrogen, Argon, Helium, and Carbon Dioxide and the like.

Further blending in a blowing agent at a rate of 0.1 to 3.0% will provide inert gasses to allow a producer to make the film lighter in weight at the same thickness. Alternatively, by maintaining the same film weight, the thickness increases. The additional thickness can increase the flexural modulus, thus producing a stiffer part.

By combining the blown film with 1 or 2 fabric layers, a thermo-formable composite can be made. The blown film is protected by the fabrics. Since the fabrics contain a high percentage of low melt formable fibers, a very stiff and durable composite can be formed.

The following are examples given to illustrate the benefits of the present invention. These examples are in no means meant to limit the invention to these particular embodiments.

EXAMPLE 1

In the first example, GA24, the following was used:
Layer 1: 200 gsm 70% Type P110 6d Black Polyester/30% Black 4 denier PETG.
Layer 2: 150 gsm Blown HDPE film with 1.0% Techmer Blowing agent.
Layer 3: 650 gsm 70% Type P110 6d Black Polyester/30% Black 4 denier PETG
Total weight 1,000 gsm
The Extrusion temperature was 210° C. to achieve full blowing potential. The products were molded using a 210° C. oven to preheat the composite assuring that the 165° C. melt point of the PETG fiber was achieved.

The result was a very stiff molded part with excellent flexural modulus.

The molded composite was tested for RAYLS and found to be very high with little porosity, but with some porosity. It was then subjected to Acoustic testing with excellent results.

The molded composite withstood long term heat and environmental aging.

EXAMPLE 2

In the second example, GA25 the following was used:
Layer 1: 200 gsm 70% Type P110 6d Black Polyester/30% Black 4 denier PETG
Layer 2: 100 gsm Blown HDPE film with 1.0% Techmer Blowing agent
Layer 3: 700 gsm 70% Type P110 6d Black Polyester/30% Black 4 denier PETG
Total weight 1,000 gsm.
The Extrusion temperature was 210° C. to achieve full blowing potential. The products were molded using a 210° C. oven to preheat the composite assuring that the 165° C. melt point of the PETG fiber was achieved.

The result was a very stiff molded part with excellent flexural modulus.

The molded composite was tested for RAYLS and found to be very high with little porosity, but better than GA24. It was then subjected to Acoustic testing with excellent results.

The molded composite withstood long term heat and environmental aging.

It was determined that the composites could be made with other blends of Polyester, Polypropylene, Nylon, Cotton, or other types of fibers. Other binder fibers could also be used.

The extruded film could be made from any thermoplastic resin such as LDPE, LLDPE, HDPE, Polypropylene, PVC, PET, Polyamide (Nylon), EVA and the like.

Adverting to the drawings, FIG. 1 illustrates a flow diagram of one embodiment of extruding the bi and/or tri layer composite composition. As shown, extruder 10 may be a standard single screw or twin screw extruder depending on the embodiment. A resin 14 is place in the extruder's hopper with blowing agent 16. The resin 14 may be among other things any polyolefin such as but not limited to HDPE, LLDPE, LDPE, and the like. Resin 14 may also be any of the polymers mentioned in specification and claims. Blowing agent 16 may be a chemical blowing agent as previous described and/or a gas injected blowing agent depending on the embodiment.

The extruder 10 has a mixing screw 12 that melts the resin pellets and mixes the blowing agent to generate microscopic voids. The voids are preferably open cell holes for use in acoustic impedance as described herein. An extrusion die 18 sets the film thickness of the polymer. And creates a film 20 with the microscopic voids or holes.

Depending on the implementation of either a bi-layer or tri-layer composite material, a fabric (non-woven) layer 22 is released from roll 23 and may or may not be stretched or worked, depending on the embodiment, for nonwoven fabric 27 to be attached to film 20 by nip rolls 28.

In a tri-layer composite implementation, another fabric (non-woven) layer 24 is released from roll 25. Again the nonwoven layer may or may not be stretched or worked, depending on the embodiment, for nonwoven fabric 26 to be attached to film 20 by nip rolls 28. Nip rolls 28 may or may not be chilled or heated depending on the embodiment. Nip rolls 28 also use mechanical pressure to squeeze the layers together. Nonwoven fabric may be made of any compositions discussed in this specification. PETG, Polyethylene, isophthallic modified PET, and/or PLA may also be used as binders in the non-woven fabric. Examples of non-woven materials include for example, and are not limited to, cellulosic, keratin, wool, cotton, polyesters, fabric, polylactic acids, nylons, rayon, polypropylene, and any combination thereof. In either a bi-layer or tri-layer composite the grams per square meter (gsm) of each layer may be controlled by nips 28 and/rollers 23, 25, and/or the line speed of the extrusion line and/or the amount of blowing agent 16. In a tri-layer composite embodiment 29, for example layer 1 of a nonwoven material may be 1-200 gsm, layer 2 of a blown film may be 1150 gsm, and layer 3 of a nonwoven fabric may be 650 gsm, for example.

Figure 2:
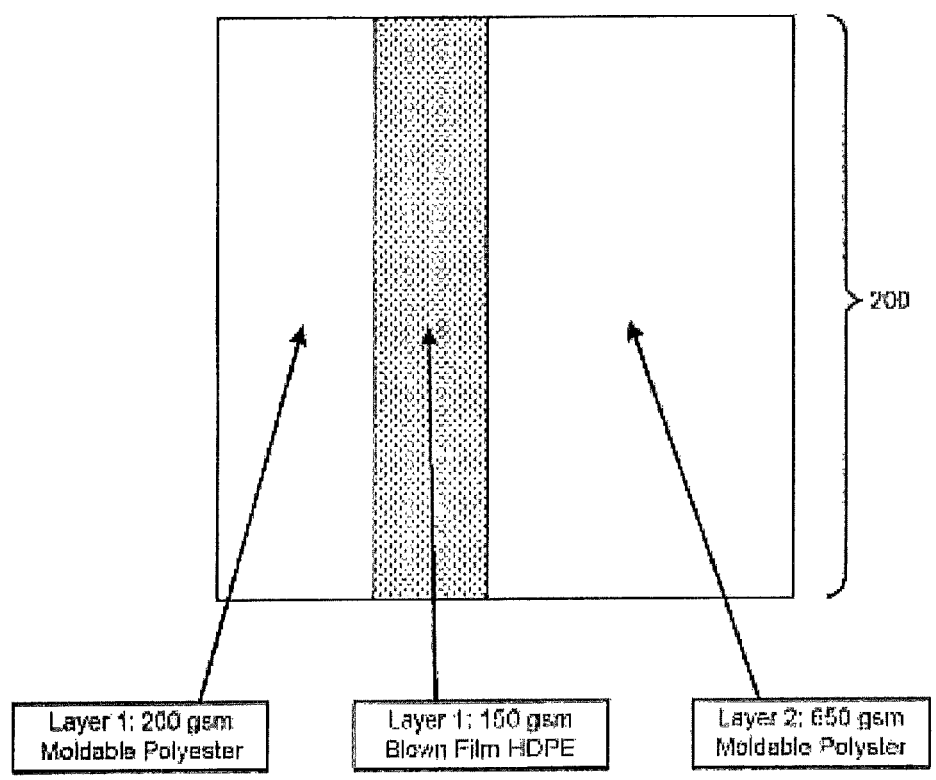
FIG. 2 is a cross-sectional view of one embodiment of a composition in accordance with the present disclosure.

FIG. 2 illustrates a moldable end product 200 of the extrusion process shown in FIG. 1 using a tri-layer composite end product. In FIG. 2, a layer of moldable polyester 210 having a 200 gsm is used. The second layer 220 is the blown film layer and in this example made of high density polyethylene (HDPE) with a 150 gsm. The third layer is a nonwoven moldable polyester 230 having a 650 gsm. The microscopic holes or cells in the blown film 220 assist with the acoustic impedance quality of the moldable material 200. This composite 200 now may be molded in any shape for automotive or other uses to assist in sound quality and acoustic impedance.

Figure 3:
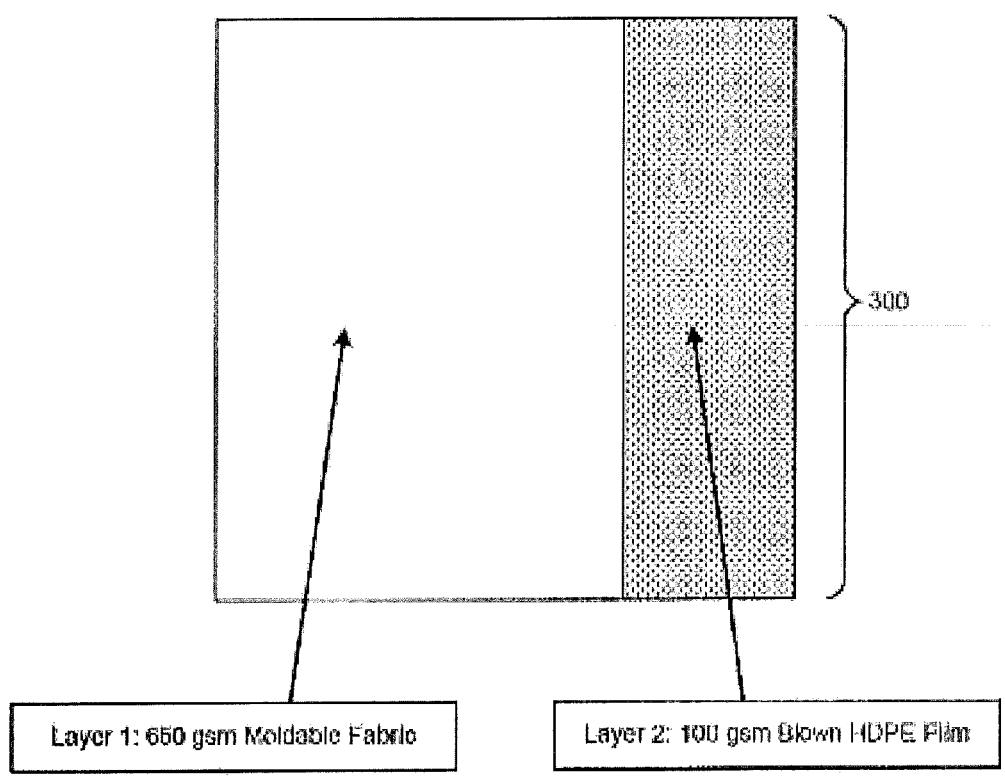
FIG. 3 is a cross-sectional view of one embodiment of a composition in accordance with the present disclosure.

FIG. 3 illustrates a moldable end product 300 of the extrusion process shown in FIG. 1 using a bi-layer composite end product. In FIG. 3, a layer of moldable fabric 310 having a 650 gsm is used. The second layer 320 is the blown film layer and in this example made of high density polyethylene (HDPE) with a 100 gsm. No third layer is used in this embodiment. The microscopic holes or cells in the blown film 320 assist with the acoustic impedance quality of the moldable material 300. This composite 300 now may be molded in any shape for automotive or other uses to assist in sound quality and acoustic impedance.

Additional materials may also be applied to any fibrous element. For example, the PTEG or PLA fibers or any of the non-woven materials or blown film described above may be treated with a performance enhancing finish, either during fiber formation or fiber blending. The finish types may vary depending on the embodiments. In some embodiments, the finish is comprised of a fluorocarbon, such as the CF fluorocarbon sold by Goulston Technologies as FC-L624. This enhances among other things the durability and moisture resistance of the moldable fabric. In other embodiments, the finish is comprised of an inorganic phosphate salt, such as that sold by Goulston Technologies as L-14951. This enhances additive also enhances the heat resistance and flame retardant and/or durability of the moldable fabric. In either instance, the performance enhancing finish preferably does not exceed 0.05% to 1.0% of the fiber weight. An alternate finish may also be comprised of a combination of a fluorocarbon and an inorganic phosphate salt to achieve fire retardant characteristics. Preferably, this alternate finish does not exceed 0.05% to 2.0% of the fiber weight. An anti-static element, such as ASY, may also be added to improve run ability, especially when the moldable fiber is manufactured within a low humidity environment.

Figure 4:
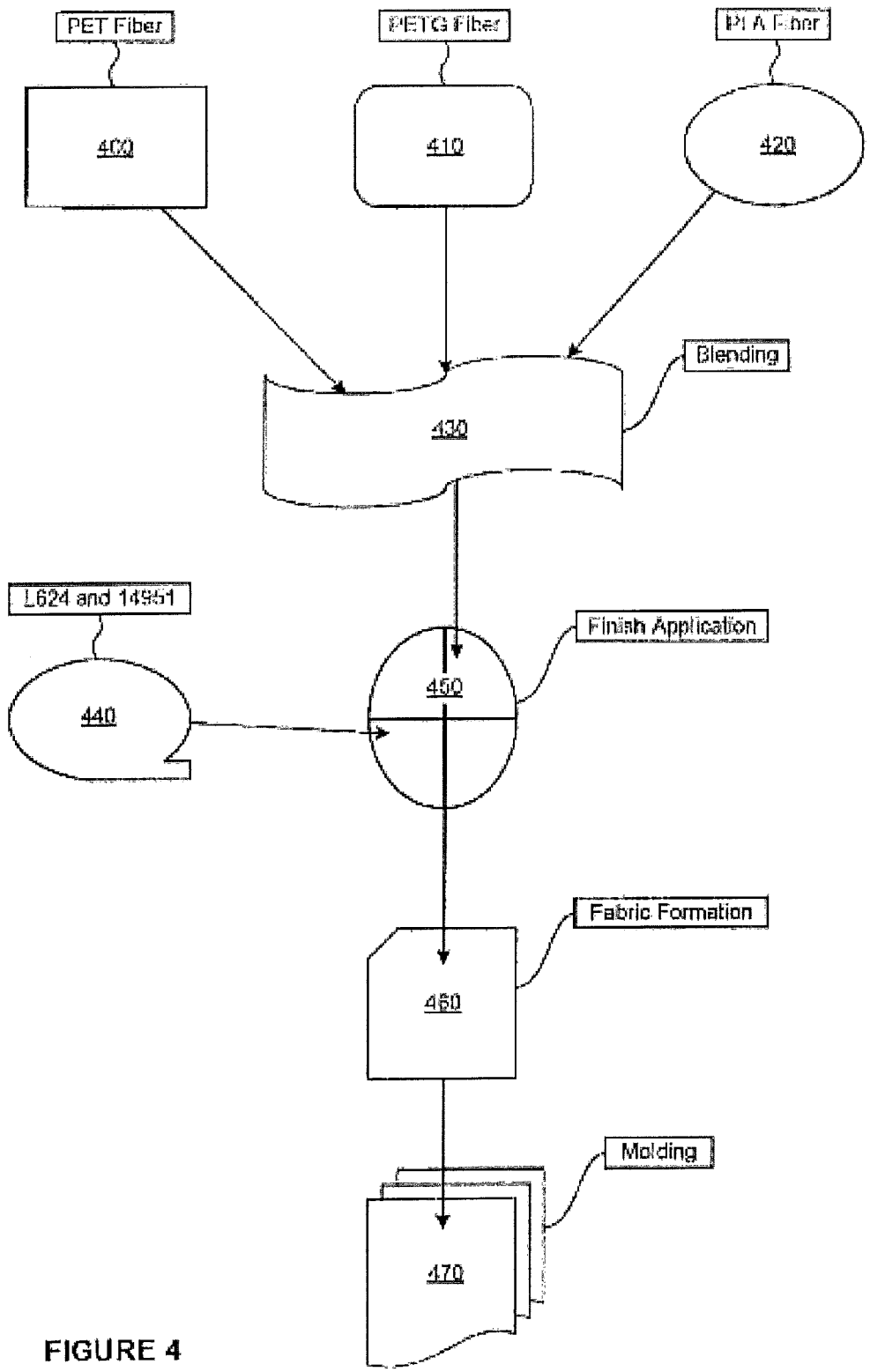
FIG. 4 is a flow diagram illustrating applying finishing material on the composite for heat exposure in automotive applications.

FIG. 4 illustrates a flow diagram for a non-woven fabric. Shown as an example, PET fiber 400, with PETG fiber 410 and PLA fiber 420 is blended in a blending machine 430. A finishing application 450 is accomplished adding additives for example those shown, but not limited to, additives in block 440. A fabric formation 46 is made that may be further molded as a product as shown in molding fabric 470 or utilized as a nonwoven fabric in the extrusion process explained in FIG. 1.

Figure 5:
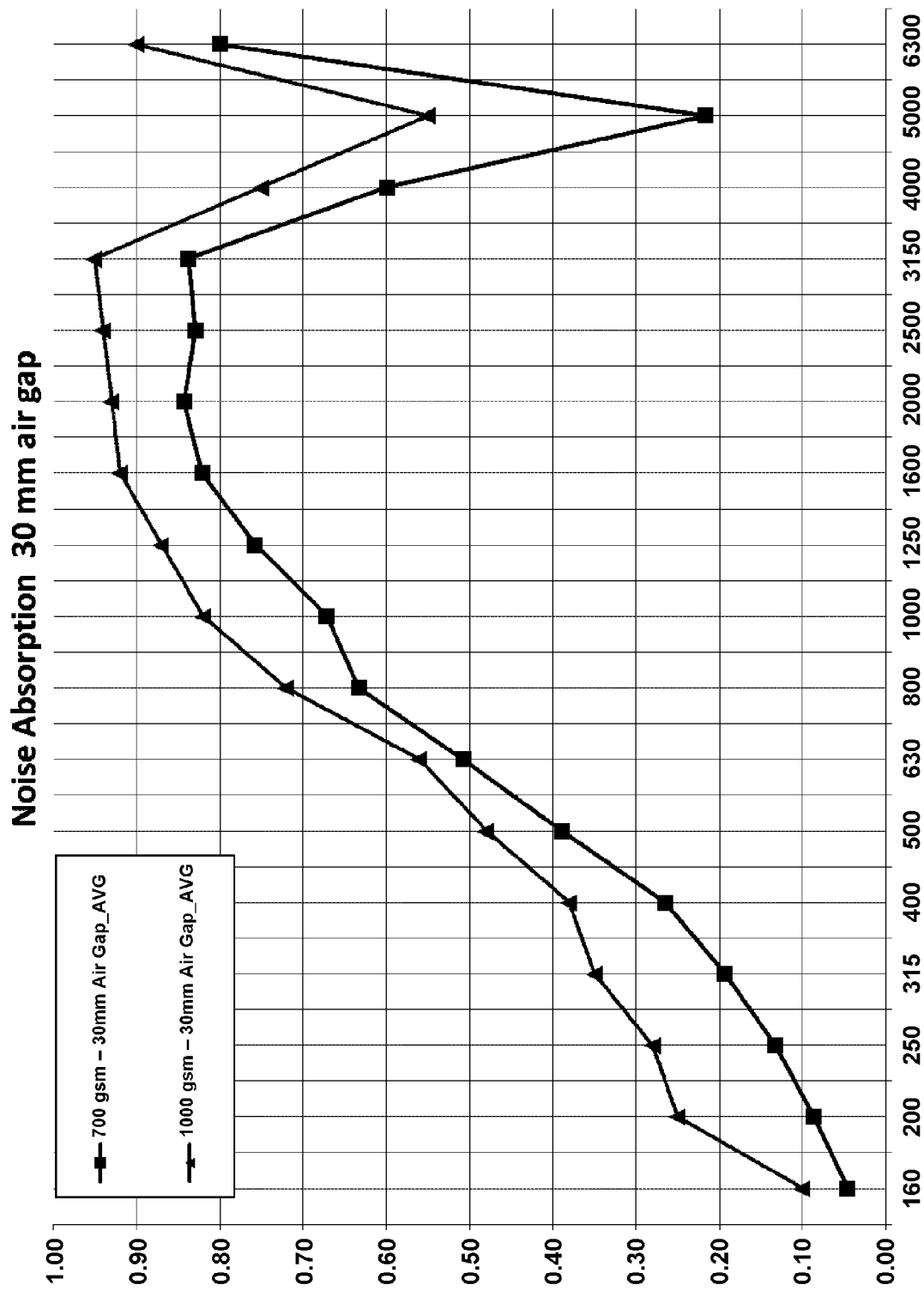
FIG. 5 is a chart showing the Noise absorption results for samples tested.

FIG. 5 illustrates a graph showing significantly reduced noise using the tested fabric. As shown 700 gsm and 1000 gsm samples had superior noise absorption qualities.

Figure 6:
FIG. 6 is a photomicrograph of a sample showing the melted portions of one of two fibers that decreases pore size to increase acoustic properties.

FIG. 6 is a photomicrograph showing the decreased pore size in a non-woven material by the melting of one of the two fibers. Decreased pore size is attributable to the increased acoustic properties (noise absorption) of the fabric.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A formable automotive structural non-woven composite comprising:
   a blend of fibers having a plurality of high melt fibers and a plurality of low melt fibers to form a first nonwoven composite layer;
   the blend of fibers further including a high melt carrier fiber of polyethylene terephthalate (PET) or polybutylene terephthalate (PBT), and a low melt binder fiber made of polyethylene glycol (PETG), Polylactic acid (PLA), Isophthallic modified PET, polyethylene, or polypropylene;
   at least one of the high melt carrier fiber or the low melt fiber is a non-flame retardant fiber containing an internal flame retardant selected from the group consisting of polyphosphonates, organophosphates, phosphonates, antimony trioxide and any combination thereof;
   the high melt carrier fiber and low melt binder fiber having at least a 10° C. (19° F.) difference in melt temperatures to allow the low melt fiber to melt during processing and stick to the high melt fibers;
   a meniscus formed between bond points of the high melt carrier fiber and low melt binder fiber when the low melt binder fiber is melted and flows into interstitial spaces between the high melt carrier fiber and low melt binder fiber;
   the first nonwoven composite layer having improved acoustic impedance due to a decreased nonwoven web pore sizes created by the low melt fibers when amorphous portions of the low melt binder fiber are melted during bonding wherein air flow resistance through the formable automotive structural non-woven composite is decreased due to the decreased web pore sizes and attributable to increased acoustic properties of the formable automotive structural non-woven composite;
   a blown film layer disposed onto the first nonwoven composition layer as a second nonwoven composite layer and forms a multi-layer nonwoven composite, the blown film layer having controlled micro-porosity of the film for restricting air flow and furthering acoustic impedance properties of the formable automotive structural non-woven composite;
   and wherein the blend of fibers further having a physical properties including a flexural modulus sufficient for automotive structural use, and heat resistance to withstand automotive engine compartment conditions and the formable composite is used as an automotive structural component for use in areas around the engine compartment or under the vehicle.

2. The formable composite of claim 1 further including a second nonwoven composite layer, the fibers having a plurality of high melt fibers and a plurality of low melt fibers, and the second layer attached to the blown film layer to form a tri-laminate.

3. The formable composite of claim 1 wherein the blend of fibers further include fiber material selected from the group consisting of polyester, nylon, acrylic, polypropylene, Polylactic acid, fiberglass and any combination thereof.

4. The formable composite in claim 1, wherein the high melt fiber and low melt binder fiber both further include a flame retardant.

5. The formable composite of claim 1 wherein the fibers are from 0.9 to 50 deniers.

6. The formable composite of claim 1 wherein the fibers are from 25 mm (1") to 180 MM (7.1") in length.

7. The formable composite of claim 1, wherein the blend of fibers further include fibers that are both high melt temperature fibers and low melt temperature fibers, and wherein the low melt and high melt temperature fibers are selected from a group consisting of polyethylene, low density polyethylene (LDPE), linear low density polyethylene (LLDPE), high density polyethylene (HDPE), polypropylene (PP), polyvinylchloride(PVC), polyethylene terephthalate(PET), polyethylene terephalate glycol-modified (PET-G),polyamide (Nylon), Ethylene Vinyl Acetate, Isophthalic modified PET, and any combination thereof.

8. The formable composite of claim 1 wherein the high melt temperature fibers range from 30 to 95% by weight in content.

9. The formable composite of claim 1 wherein the low melt temperature fibers range from 5 to 70% by weight in content.

10. The formable composite of claim 1 wherein the fibers range from 0.7 to 100 denier and a length from 12 mm to 180 mm (0.5 to 7").

11. The formable composite of claim 1 further includes a second a blown film layer combined with the first composite layer or a second blown film combined with the first composite layer and the second composite layer.

12. The formable composite of claim 1 wherein the blown film is defining holes formed using an inert gas during an extrusion process.

13. The formable composite of claim 12 furthering including use of an inert gas is selected from a group consisting of air, nitrogen, carbon dioxide, carbon monoxide, helium, argon, oxygen, and any combination thereof.

14. The formable composite of claim 13 wherein the holes in the blown film are formed using a blowing agent blended with the film at a weight percentage of 0.2% to 3.0%.

15. The formable composite of claim 1 wherein the holes in the blown film are formed using a blowing agent blended with the film at a weight percentage of 0.2% to 3.0%.

16. The formable composite of claim 1 wherein each nonwoven fabric layer is 50 grams per square meter (gsm) to 2000 grams per square meter (gsm).

17. The formable composite of claim 1 wherein the each nonwoven fabric layer is 50 grams per square meter (gsm) to 1,200 grams per square meter (gsm).

18. The formable composite of claim 1 wherein the porosity of air flow measures greater than 1.5 M-RAYLS.

19. The formable composite of claim 1 wherein the low melt binder fiber is blended with natural fibers such as cotton, wool, flax, jute, or mineral fibers.

20. The formable composite in claim 1 wherein the low melt binder fiber is between 5% and 75% of the composite.

21. The formable composite of claim 20 wherein the flame resistance rate is V-0.

22. A method of making a formable automotive structural non-woven composite, comprising:
extruding a high melt and a low melt nonwoven polymeric fibers and incorporating a flame resistant additive into the low melt fiber having at least one region defining holes to create a microporous open cell structure for acoustic impedance, and heat and flame resistance.

23. The method of claim 22 wherein the flame resistant additive is a polyphosphonate.

24. The method of claim 23 wherein the extruding is done below 290° C. to avoid degradation of the polyphosphonate.

25. A method of making a formable automotive structural non-woven composite, comprising:
compounding a flame retardant into a carrier fiber, wherein the flame retardant is supportive to provide heat resistance to withstand automotive engine compartment conditions and the flame retardant is selected from a group consisting of polyphosphonate, organophosphates, phosphonates, antimony trioxide, halogens and any combination thereof; and wherein the carrier fiber is selected from a group consisting of polyethylene glycol (PETG) cyclohexanedimethanol (CHDM), polyester, nylon, acrylic, polypropylene, polylactic acid, fiberglass, and any combination thereof; said compounding done below 290° C. with no heat history;
drawing the carrier fiber at a low draw ratio of approximately 2-2.5 to prevent crystallinity from occurring thereby creating an amorphous carrier fiber; and
creating a nonwoven web material having pores by combining the carrier fiber with a blend of fibers having physical properties that includes a flexural modulus sufficient for automotive structural use, wherein amorphous fibers will melt at a lower temperature filling the pores within the nonwoven material to block air and create resistance for sound.

26. The method of making a formable automotive structural non-woven composite of claim 25, further comprising:
combining a first layer nonwoven material having improved acoustic impedance due to decreased nonwoven web pore sizes with
a blown film layer to form a multi-layer nonwoven composite, the blown film having controlled microporosity of the film for restricting air flow and furthering acoustic impedance properties.

27. The method of making a formable automotive structural non-woven composite of claim 26, further comprising:
combining a second layer nonwoven material to the blown film layer, and
forming a tri-layer composite material that has acoustic impedance properties, moisture resistance, structural integrity, and heat resistance to withstand environmental conditions inside an automobile engine compartment and underneath the automobile's undercarriage and wheel wells.

* * * * *